C. L. CHISHOLM.
TELEPHONE TRANSMITTER.
APPLICATION FILED JAN. 8, 1907.
920,431.
Patented May 4, 1909.
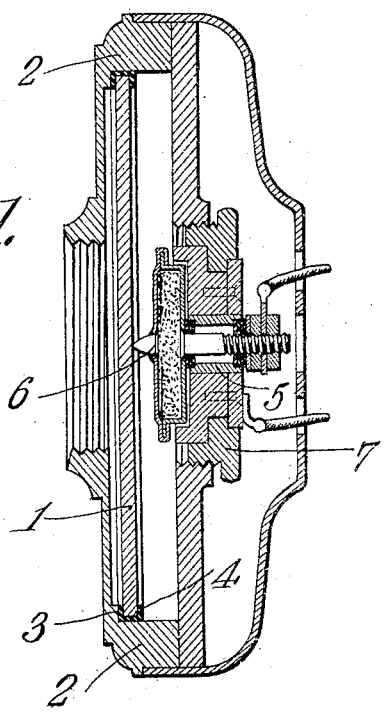
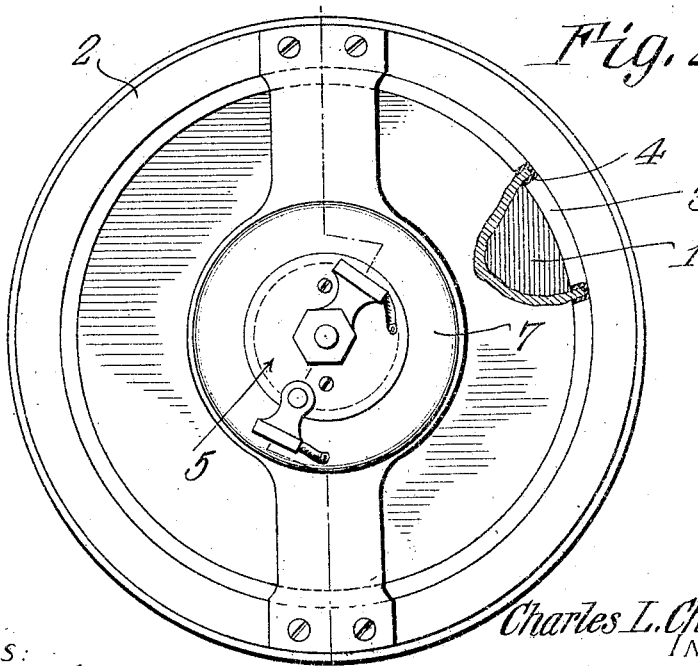
WITNESSES:
E. F. Stewart
C. Bradway
Charles L. Chisholm,
INVENTOR.
By C. A. Snow & Co.
ATTORNEYS

UNITED STATES PATENT OFFICE.

CHARLES L. CHISHOLM, OF MARYSVILLE, NEW BRUNSWICK, CANADA.

TELEPHONE-TRANSMITTER.

No. 920,431.  Specification of Letters Patent.  Patented May 4, 1909.

Application filed January 8, 1907. Serial No. 351,375.

*To all whom it may concern:*

Be it known that I, CHARLES L. CHISHOLM, a subject of the King of England, residing at Marysville, New Brunswick, Canada, have invented a new and useful Telephone-Transmitter, of which the following is a specification.

The invention relates to acoustic instruments and particularly to telephone transmitters, the object in view being to provide such a construction and arrangement of parts as to prevent the formation of nodes in the diaphragm and cause the sound waves or beats to affect the diaphragm on truly concentric lines, thereby insuring the transmission of the message without interference or disturbance of secondary or false vibrations. To accomplish this it has been found necessary to provide the diaphragm with a comparatively narrow peripheral bearing upon which it is securely held in a suitable insulating bed, all of that portion of both surfaces of the diaphragm which is inside of the bearing being unobstructed with the exception of the single central point of practically unconsiderable area upon which bears the contact pin or member through which the vibrations, or the effects of the vibrations, are conveyed to the microphone; and further it has been found necessary in order to prevent the formation of secondary vibrations to place the diaphragm under stress or tension to a degree which will insure ample resistance to induced vibration or formation and cause the waves or beats of the diaphragm to be arranged on lines truly concentric with the central point of contact; and in order that the diaphragm thus peripherally supported with a narrow area of support and being thus placed under a tension sufficient to eliminate the possibility of vibration except under the influence of sound waves attacking the same or impingement upon the surface thereof, it has been found necessary to use a diaphragm of relatively small diameter and great thickness as the extreme concaving or deflection of the diaphragm from the true flat plane is not desirable. The intimate relations existing between the contact point and the diaphragm due to the tension applied to the diaphragm by means of the contact pin insures the true and accurate transmission of the impulses from the diaphragm to the contact point, entirely eliminates the possibility of there being any separation or break between the diaphragm and the contact point, and insures what may be termed an uniform condition of the diaphragm on concentric lines, the rigidity of the diaphragm serving to resist the pressure of the contact point and thus avoid the deflection thereof which would tend to destroy the flat surface presented for the impingement of the sound waves entering the transmitter.

Various other objects of the invention will appear as the same is more fully disclosed, and it will be understood that various changes in the form, proportions and minor details of construction may be resorted to without departing from the spirit of the invention which is set forth in the appended claims.

In the accompanying drawings:—Figure 1 is a diagrammatical sectional view of a transmitter embodying the invention. Fig. 2 is a face view of the same, the cap being omitted.

Similar numerals of reference indicate corresponding parts throughout the several figures of the drawings.

The diaphragm 1 is seated in a frame 2 as in the ordinary practice, it being noted that the seat 3 is of small area so as to engage the diaphragm only at its periphery, the usual or any preferred bed 4 being employed to embrace the periphery of the diaphragm. The ordinary or any preferred microphone is represented by the numeral 5, and the contact pin 6 is reduced terminally to bear upon the surface of the diaphragm at its exact center, thus leaving all portions of both surfaces of the diaphragm unobstructed except at this central point. The means employed for adjusting the contact pin may be varied to suit the peculiarities of construction of the microphone and related parts, but in the form illustrated in the drawing the screw 7 serves for the purpose of advancing the contact pin to a greater or less extent to place the diaphragm under the desired tensional stress with the effect of insuring a relatively fixed position of the diaphragm at its true center, and thereby insure the formation of sound waves or beats on truly concentric lines. It has been found in practice that by adjusting the contact point to exert a greater or less pressure on the diaphragm, when the diaphragm is of a thickness or stiffness capable of resisting a considerable pressure, the secondary or false tones or screeching, or as it may more properly be termed, harmonics, can be entirely eliminated, and, therefore, by adjusting the parts of a transmitter this coöperative relation between the contact pin and the diaphragm can be established to secure the desired result, slight variations in the thickness or rigidity of the diaphragm being compensated for by the possibility of adjustment of the contact pin.

I am aware of the fact that transmitters have been devised heretofore with various thicknesses of diaphragms and that it has also been proposed to apply pressure to the contact pin sufficient to produce a concavo-convexity of the diaphragm, the diaphragm thus being in a sense cut, but it will be noted that the object of this invention is not to cause a concavo-convex construction of the diaphragm, but to use a diaphragm of a rigidity sufficient to resist a pressure of the contact pin which will be sufficient to eliminate false tones and insure the faithful reproduction of the waves impinging thereon, whereby the over tones which are so often lost in transmission and which form the character of the tone and the recognizability, especially as to voices thereof may be preserved and transmitted. This can be accomplished satisfactorily by establishing such a relation between the rigidity of the diaphragm and the stress of the contact pin as will place the diaphragm while flat and in position to properly receive the contact of the sound waves under such a tension as to prevent the formation of nodes and hence of false notes and harmonics.

I claim:—

1. In a telephonic transmitter, a comparatively thick and superficially unobstructed diaphragm having a peripheral support of small area, and a microphonic element having a contact pin bearing directly on the diaphragm with the bearing surface of practically inconsiderable area, the diaphragm being of such thickness as to not sensibly dish under the pressure of the contact pin necessary to maintain the contact.

2. In a telephonic transmitter, a comparatively thick and rigid and superficially unobstructed diaphragm, and a microphonic element having a contact pin with a bearing surface of practically inconsiderable area directly engaging but unsecured to said diaphragm.

In testimony that I claim the foregoing as my own, I have hereto affixed my signature in the presence of two witnesses.

CHARLES L. CHISHOLM.

Witnesses:
 E. HUME TALBERT,
 W. J. DILLON.